United States Patent [19]

Deneau

[11] 4,244,605

[45] Jan. 13, 1981

[54] MATERIAL FOR FORMING GRAPHICS

[75] Inventor: Kenneth S. Deneau, Hudson, Wis.

[73] Assignee: Minnesota Mining and Manufacturing Company, St. Paul, Minn.

[21] Appl. No.: 43,106

[22] Filed: May 29, 1979

Related U.S. Application Data

[62] Division of Ser. No. 844,600, Oct. 25, 1977, Pat. No. 4,157,412.

[51] Int. Cl.³ .............................. B41L 1/20; B32B 5/16

[52] U.S. Cl. ..................................... 282/27.5; 428/207; 428/323; 428/327; 428/332; 428/913; 428/914

[58] Field of Search ............... 428/323, 207, 913, 914, 428/327, 332; 156/234, 240, 241, 272; 282/27.5

[56] References Cited

U.S. PATENT DOCUMENTS

| | | | |
|---|---|---|---|
| 3,640,219 | 2/1972 | Farnham et al. | 156/234 |
| 3,751,318 | 8/1973 | Newman | 156/234 |
| 3,924,041 | 12/1975 | Miyayama et al. | 428/913 |
| 4,103,053 | 7/1978 | Barehas | 428/207 |
| 4,123,309 | 10/1978 | Perrington et al. | 156/234 |

*Primary Examiner*—Paul J. Thibodeau

*Attorney, Agent, or Firm*—Cruzan Alexander; Donald M. Sell; William L. Huebsch

[57] ABSTRACT

A composite material for forming graphics such as letters or numbers. The composite material includes a layer of latent adhesive material, a mono-layer of granules lightly adhered to a donor web, and a thin layer of bonding material between and in face-to-face contact with the layers of granules and adhesive. The layer of bonding material maintains the adhesive and granular layers in close proximity and excludes air from therebetween. When the composite material is selectively heated in graphic patterns, corresponding portions of the bonding layer melt; and corresponding portions of the adhesive material and granular layer soften, absorb the melted portions of the bonding layer and adhere together. Upon subsequent separation of the layer of adhesive and the donor web the remaining portions of the layer of bonding material separate, whereas granules transfer to the accepting tape in the heated areas to provide the graphics.

5 Claims, 10 Drawing Figures

MATERIAL FOR FORMING GRAPHICS

This is a division of application Ser. No. 844,600 filed Oct. 25, 1977, now U.S. Pat. No. 4,157,412.

FIELD OF THE INVENTION

This invention relates to composite materials used in forming graphics such as letters, numbers, symbols and pictures and in one aspect to composite materials used in forming graphics which may be transferred to a substrate.

BACKGROUND OF THE INVENTION

One system is known in which graphics are formed by causing a layer of adhesive material to selectively adhere to a layer of granules by selectively heating the adhesive in graphic patterns so that upon separation of the layers, graphics will be formed by transfer of the granules to the adhesive layer. This system is described in U.S. Pat. No. 4,123,309, assigned to the assignee of this application.

Briefly, in that system graphics are formed along a composite strip material comprising (1) an accepting portion or tape comprising a layer of latent adhesive material and (2) a transfer portion or tape comprising a donor web carrying a lightly adhered layer of microgranules in face-to-face contact with the layer of adhesive material. At least one of the microgranule and adhesive layers bears a radiation absorbing pigment, and the strip material is essentially transparent to radiant energy between one exterior surface and the pigment so that the pigment may be exposed to heat-producing radiation. Upon momentary exposure to a pattern of radiation, the pigment is selectively heated and momentarily softens the adjacent portions of the layer of adhesive material which, upon solidification, visibly adhere to the microgranules. After a series of such exposures have been made, the accepting tape and donor web are separated, transferring microgranules to the accepting tape only in irradiated areas to provide the graphics. The graphics can be used on the accepting tape, or if the microgranules comprise a thermoplastic resin which acts as an adhesive upon softening, the graphics carried by the accepting tape can be adhered to a substrate simply by application of sufficient heat through the accepting tape to soften the thermoplastic resin. Moreover, the microgranules remaining on the donor web after separation of the accepting tape can be adhered to a substrate by the application of heat through the donor web, and the donor web may be peeled away to leave a negative of the graphics.

While that system can form graphics with such resolution that even half-tone photographs may be reproduced, the device required to expose the strip material (described in U.S. Pat. No. 3,828,358) is more complex and expensive than might be desired. The adhesive and microgranular layers will not adhere to each other unless they are exposed to intense radiation while the layers are in intimate contact. Such intimate contact must be achieved by complex mechanisms in the exposure device which press the layers together under great pressure in such a manner so as to remove air from between the layers.

SUMMARY OF THE INVENTION

The present invention provides a composite material which, like the composite material in the system described above, also makes possible the production of graphics which are immediately visible to permit composing graphics along a strip of material. While the graphics produced have slightly less resolution than the graphics produced by the system described above, they are of suitable quality for many applications such as posters or visual transparencies. The composite material includes means for maintaining its layers in close proximity and excluding air from therebetween so that it can be exposed on devices of less complexity than the device required to expose the strip material described above. Also, the composite material according to the present invention can also be used to make high quality copies or transparencies of a document in existing office copy machines.

Like the composite material described in U.S. Pat. No. 4,123,309, the composite material according to the present invention includes an accepting portion comprising a layer of latent adhesive material, which adhesive material is nontacky at normal room temperature, but is softened and activated when heated to a temperature range somewhat above normal room temperature; a donor web; and a friable layer of granules releasably adhered to the donor web and facing the layer of adhesive material.

Unlike that composite material, however, the composite material according to the present invention also includes bonding material in a thin layer between and in face-to-face contact with the layer of granules and the layer of latent adhesive material. The bonding material has a melting temperature below the softening temperature of the adhesive and bonds the layer of granules and adhesive together in close proximity. During imagewise heating of the composite material, the bonding material restricts air from entering between the layers of adhesive and granules, and melts and is absorbed or adsorbed by at least one of those layers to allow the granules and adhesive to adhere together in the heated areas. Thus the bonding layer eliminates the need for substantial external pressure on the material during imagewise heating. Also the bonding layer provides a barrier which ensures that the granules will not adhere to the adhesive except in the heated areas so that adhesive material and granules having a great affinity to each other may be used. The bonding layer will separate either within itself or from either the layer of adhesive material or the layer of granules upon separation of the accepting portion and donor web so that there will be no transfer of granules in nonheated areas of the composite material.

Preferably the granules are formed by a novel method which produces a layer of plate-like granules which is only one granule thick (called a mono-layer herein) with the granules having a small average diameter (e.g. in the range of about 0.001 to 0.004 inch) and being disposed in side-by-side relationship on the donor web. This structure affords complete removal of the granules from the donor web by adhesion of the adhesive layer only to the adjacent surface of the layer of granules, while providing a visually clean break line between granules adhered to the adhesive in the heated areas and granules around the periphery of the heated areas.

In one embodiment of the composite material adapted for use in graphic composing devices, the composite material includes a radiation absorbing pigment and is essentially transparent to radiant energy between one exterior surface and the pigment so that the pigment may be exposed to patterns of heat-producing radiation. Upon momentary exposure to a pattern of radiation, the pigment is selectively heated, melts the adjacent bonding material, and momentarily softens adjacent portions of the layer of adhesive material and the layer of granules which absorb the melted bonding material and, upon solidification, adhere together. This embodiment of the composite material may be exposed by brief intense radiation in predetermined graphic patterns by a device such as that commercially designated the Model 287 transparency composer which is sold by the Minnesota Mining and Manufacturing Company. That device includes an xenon flash lamp and provides an energy input to the lamp of about 20 watt seconds per square inch of area to be exposed, which has been found to form acceptable graphics with the composite material.

Another embodiment of the composite material is adapted for copying graphics already composed on a document. The document is placed in face-to-face contact with the composite material and irradiated to heat the graphics. Heat is conducted from the graphics into the composite material to selectively heat the layers in the graphic patterns; thereby melting corresponding portions of the bonding layer and adhering portions of the granular and adhesive layers together so that upon separation of the accepting portion and donor web granules will transfer to the adhesive in the graphic pattern. This embodiment of the composite material may be suitably exposed by sending the composite material and document to be copied through a Model 45 office copy machine manufactured by Minnesota Mining and Manufacturing Company, which provides an exposure with an infrared energy source of about 3.3 watt seconds per square centimeter of exposed area (21.1 watt seconds per square inch) delivered over a time duration of about 0.08 seconds.

The material in the bonding layer should be a solid at room temperature and melt at a temperature sufficiently above room temperature (e.g. above 60° Centigrade) to permit shipping and storage without refrigeration, but below the softening temperature of the adhesive or granular layers so that it may be melted to laminate the adhesive or granular layers together without being absorbed by either of those layers. Also, the melted material of the bonding layer should conform and adhere to the surfaces of the granular and adhesive surfaces upon solidification so that the bonding layer will maintain the adhesive and granular layers in close proximity and exclude air from between these layers while providing a barrier to prevent contact therebetween. The bonding layer should be of a material that can be absorbed or adsorbed by at least one of the adhesive or granular layers. Also, the material of the bonding layer should have less internal cohesion or adhesion to its adjacent layers than does any other layer of the composite material so that unexposed portions of the composite material will separate at the bonding layer. This separation may occur between the bonding layer and the adjacent granular or adhesive layers, or within the bonding layer itself.

Materials for the bonding layer which have been found to work well are waxes which are solids at room temperature, have melting points sufficiently above room temperature to allow storage (preferably at about 142° F.), and which coat well at low concentrations in hydrocarbon solvents to produce a coating weight of about 0.32 grams per square meter (0.03 gram per square foot). A specific example is the wax designated "Shellmax 500", which is available from the Shell Oil Company.

The granular layer should be comprised of granules of a sufficiently small size to afford a separating line generally normal to the surface of the donor web, which separating line closely conforms to the periphery of an irradiated area so that the edge of the graphic will be clean and sharp. Also, the layer of granules should have sufficient thickness to provide the optical density or opaqueness required of the graphics to be formed for a particular application, should adhere readily to the adhesive layer in the presence of the melted bonding material which may be absorbed or adsorbed by the granules. Also preferably the granules should act as an adhesive upon softening (which should occur at a temperature sufficiently above the melting temperature of the material in the bonding layer to afford lamination of the adhesive and granular layers with the bonding layer) to allow the graphics carried by the accepting portion to be adhered to a substrate (such as a paper or visually transparent plastic sheet) simply by application of sufficient heat through the accepting portion to soften the granules. Additionally with granules of this type, the granules remaining on the donor portion after separation of the accepting portion can also be adhered to a substrate by the application of heat through the donor web to provide a negative of the graphics.

Where the composite material is adapted for use in composing graphics by imagewise exposure, the granules may include a pigment of a dark color (e.g. carbon black) so as to efficiently absorb and be heated by the radiation, which in turn will melt the bonding layer and soften the adhesive and granular layers to cause adhesion therebetween in the irradiated areas. Alternatively this pigment could be included in the adhesive layer or in a receiving web supporting the adhesive layer if light graphics on a dark background are desired.

Where the composite material is used for making copies of graphics already composed on a document via selective heating from the document, the granules may include pigments of any desired color to provide transparent or opaque graphics.

Preferably the granules are a mono-layer of granules (i.e. a layer of granules only one granule thick) of about 0.08 millimeter (0.003 inch) or less in diameter which can adhere to the layer of adhesive via surface contact without the need for the adhesive to flow into the interstices between the granules. These granules are comprised of a thermoplastic resin coated on a backing and dried by a novel method which promotes the formation of very small plate-like granules of the resin releasably adhered to the backing and adhered together at their margins by portions of the resin recessed from the exposed surface of the granules. Generally, that method comprises (1) dissolving the thermoplastic resin in a solvent mixture in which the resin is completely soluble, the mixture comprising a first highly volatile solvent and a second significantly less volatile solvent in which second solvent alone the resin is only partially soluble; (2) evenly coating the dissolved resin on a backing layer; (3) heating the coated backing layer at a first temperature adapted to evaporate the first highly volatile solvent at a much faster rate than the second solvent and cause the mixture to become mostly the second solvent so that the resin semi-solidifies in a mono-layer of localized granular-like areas; and then (4) evaporating the remaining solvent mixture to solidify the semi-solidified areas and provide the granular coating.

A suitable thermoplastic material which may be coated by this method is polyamide resin designated "Versamid 750" and commercially available from General Mills, Inc. This resin when dissolved in a 50/50 blend (by weight) of heptane (the first highly volatile solvent) and isopropanol (the second, less volatile solvent) and dried first at 38° Centigrade (100° F.) for about 20 seconds, and then at 82° Centigrade (180° F.) produces the desired granular layer in which the granules have an average diameter of about 0.08 millimeter (0.003 inch) and are releasably adhered together at their margins by resin recessed from the surface of the granules. This resin provides the advantages of having a melting point of between 49 and 66 degrees Centigrade (120 to 150 degrees Fahrenheit), tolerates the absorption of wax such as "Shellmax 500" and will accept various pigments including sufficient quantities of carbon black to provide dark colored granules when that is desired.

The adhesive layer should be as thin as possible (preferably less than 1.3 millimeter or 0.05 inch) while still affording adequate adhesion to the granules to that radiant energy requirements to soften the adhesive material are minimized. The adhesive material should soften over a relatively narrow temperature range which is sufficiently above the melting temperature of the bonding layer to permit the adhesive and granular layers to be laminated together by melting the bonding layer without softening the adhesive layer, but which does not require excessive power output by the exposure source (e.g. 110 to 150 degrees Centigrade). When the composite material includes pigment in the layer of granules which is heated by imagewise exposure, preferably the adhesive layer softens at a temperature slightly less than the softening temperature of the granules (e.g. about 5.6° Centigrade (10° F.) less) so these layers will soften more nearly at the same instant. Also, the adhesive layer should not be softenable by the solvents used to coat the bonding material. During the softening of the adhesive material, it should adsorb at least a portion of the melted bonding material, and must wet and adhere to the microgranules. When the composite material is of the type which affords transfer of the graphics from the receiving web to a substrate, the adhesive material, which is softened during the transfer, preferably should have little tendency to transfer with the graphics and should be relatively clear so that portions which transfer with the graphics will not detract from their visual appearance.

One suitable adhesive material is a polyamide resin which softens upon a low energy input at between 110 and 150 degrees Centigrade, such as that designated "Versamid 940" and available from General Mills, Inc.

The donor web and receiving web should have sufficient strength and dimensional stability over the temperature range to which the material is subjected to prevent distortion of the graphics. The donor web should provide sufficiently low adhesion to the granules to allow them to be peeled away in heated areas, while providing sufficiently high adhesion that they will not be pulled away by the force caused to separate the bonding layer in the nonheated areas. The receiving web should provide good adhesion to the solidified adhesive layer. A suitable material for both the donor and receiving webs is the polyester polyethylene terephthalate, however other materials such as cellulose acetate butyrate or polystyrene may also be useful.

The receiving web should be stiffer than the donor web which, when the webs are of the same material, will be the case if the receiving web is somewhat thicker than the donor web (e.g. preferably about twice as thick) and each web has a thickness in the range of 0.013 to 0.25 millimeters (0.0005 to 0.01 inches). The lesser thickness of the donor web causes it to peel back upon itself more sharply than does the receiving web when the two are separated subsequent to exposure of the composite material, thereby promoting clean separation of the granules from the donor web in the exposed areas.

Either the donor web or receiving web may be adapted for direct application to a substrate after formation of the graphics or their negative by coating their outer surfaces with a pressure-sensitive adhesive. The pressure-sensitive adhesive should be protected by a releasable overlay which may be stripped away to permit application.

Also the composite material preferably should have a layer of an antistatic material (e.g. such as a 0.011 gram per square meter (0.001 gm/ft$^2$) coating of the quaternary amine designated "Catanic SN" and available from American Cyanamid) on the surface of the receiving web opposite the adhesive material which is helpful to dissipate any static charges that may be developed on the material during coating. This antistatic material restricts the attraction of dirt particles to the material during coating and laminating of the material which dirt, if present, could cause voids in the lamination resulting in nontransfer of granules in imaged areas.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
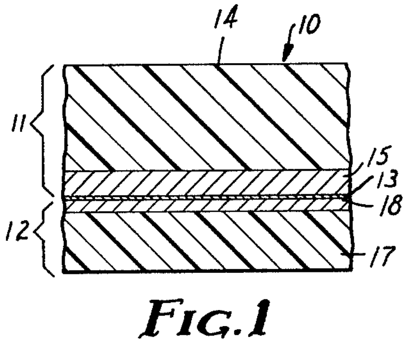
FIG. 1 is an enlarged fragmentary sectional view of a first embodiment of the composite material according to the present invention.

FIG. 1 shows a first preferred embodiment of the composite material according to the present invention generally designated by the numeral 10, in which the composite material is an elongate strip and is adapted for composing dark colored graphics. The strip material 10 consists of an accepting portion or tape 11 and a transfer portion or tape 12. The portions 11 and 12 each include a coating which coatings are positioned in face-to-face relationship and adhered together by a thin layer of bonding material 13.

The accepting tape 11 consists of a strong thermally stable receiving web 14 and the firmly adhered coating or layer of adhesive material 15 having a narrow softening range above normal ambient or room temperature. Both the receiving web 14 and the adhesive material 15 are essentially transparent to radiation. The transfer tape 12 includes a strong thermally stable donor web 17 which is also essentially transparent to radiation and is thinner than the receiving web 14, and a mono-layer of granules 18 releasably adhered to the donor web 17. A radiation absorbing pigment such as carbon black is incorporated in the mono-layer of granules 18 to give them a dark radiation absorbing color.

Figure 2:
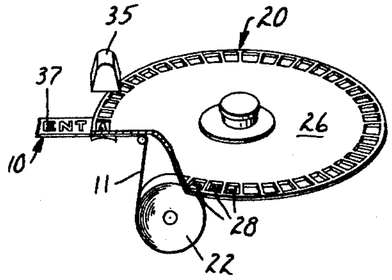
FIG. 2 is a schematic perspective view of a device for composing graphics on the composite material of FIG. 1.

FIG. 2 schematically illustrates a suitable device 20 for forming graphics along the strip material 10. The device 20 is similar to the device more fully described in U.S. Pat. No. 3,914,775, the disclosure whereof is incorporated herein by reference.

Briefly, the device 20 includes means for supporting a reel 22 of the composite strip material 10, and for guiding the strip material 10 along a path. An opaque circular template 26 is provided which has openings in a metallic layer to provide a series of windows 28 in the shape of graphics to be formed. The template 26 is rotatably mounted to position any one of the windows 28 over the strip material 10 with the window adjacent its receiving web 14 at a predetermined position along the path. A xenon flash lamp 35 can be activated to irradiate the strip material 10 through the aligned window 28, and thereby form a graphic corresponding to the window 28.

The device 20 also includes manually operated drive means (not shown) for advancing the strip material 10 along the path between exposures by the xenon flash lamp 35, so that graphics 37 may be formed seriatim along the strip material 10.

Upon exposure, the exposed granules 18 are heated and in turn heat and melt the adjacent portions of the bonding layer 13 and soften the adjacent portions of the adhesive layer 15. The melted portions of the bonding layer 13 are absorbed by the softened portion of the adhesive layer 15 and/or the layer of granules 18 and the adhesive layer 15 and granules 18 adhere together in the exposed areas.

Figure 3:
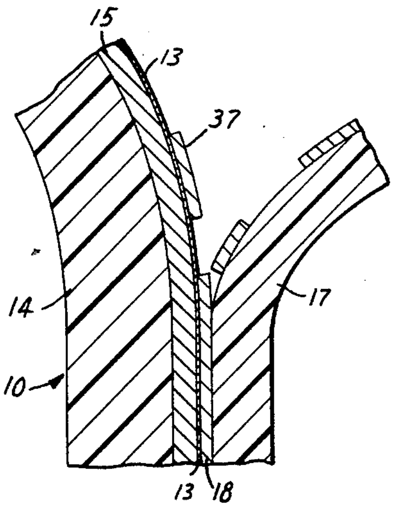
FIG. 3 is a fragmentary sectional schematic view of the composite strip material of FIG. 1 having graphics formed thereon and partially separated to show the transfer of granules from a donor web to a receiving web.

Subsequent to exposure, the donor and receiving webs 17 and 14 of the strip material 10 may be separated as illustrated in FIG. 3. Granules from the layer 18 adhere to that portion of the layer of adhesive material 15 which was softened upon exposure by the xenon flash lamp 35 and transfer to the receiving web 14 in accordance with the pattern of received radiation. The donor web 17, being thinner and less stiff than the receiving web 14, bends more sharply at their point of separation, thereby aiding in the clean transfer of the granules. Such transfer provides sharply defined graphics 37 on the receiving web 14 and an equally sharply defined negative of those graphics in the granules remaining on the donor web 17.

The strip material 10 may either be exposed through the receiving web 14 to form graphics that may be read through the receiving web 14, or may be exposed through the donor web 17 to form graphics that may be read on the exposed surface of the adhesive layer 15 after the accepting tape 11 is separated from the transfer tape 12.

Figure 4:
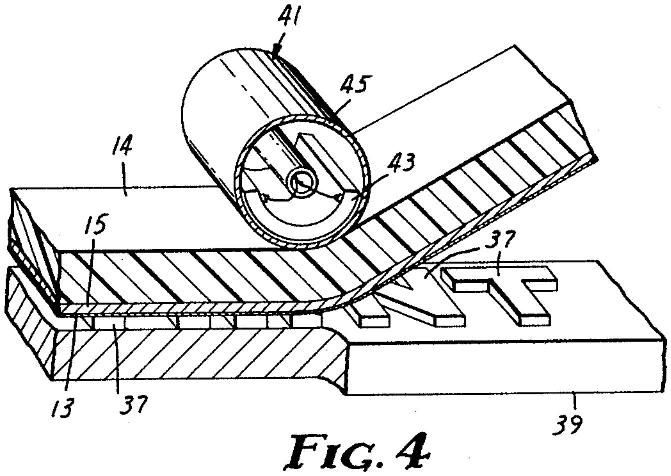
FIG. 4 is a fragmentary perspective schematic view of the separated receiving web of FIG. 3 illustrating the transfer of graphics from the receiving web to a substrate.
Figure 5:
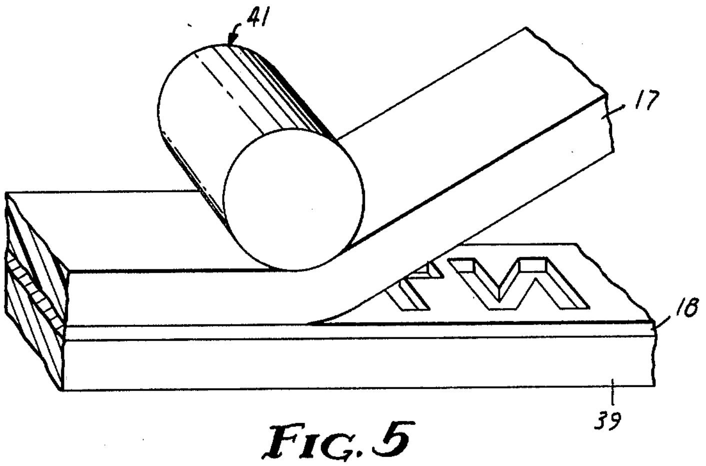
FIG. 5 is a fragmentary perspective schematic view of the separated donor web of FIG. 3 illustrating the transfer of the layer of granules to a substrate, which layer provides a negative of the graphics.

If the layer of granules 18 comprises a thermoplastic resin having adhesive properties upon softening, graphics 37 exposed on the receiving web 14, or the negative thereof on the donor web 17, may be adhered to a substrate by application of heat through the receiving web 14. As illustrated in FIG. 4, the graphics 37 are positioned adjacent a substrate 39 (which may be paper or transparent plastic) and are activated by the application of heat from a hand guided heating member 41 comprising a heating element 43 and a housing 45 pressed against and drawn along the opposite surface of the receiving web 14. The heat softens the adhesive material 15 and allows the receiving web either to be adhered to the substrate 39 over the graphics 37 or to be peeled away. Similarly, a negative of the graphics may be adhered to the substrate 39 by application of heat against the separated donor web 17 as shown in FIG. 5.

Alternatively heat to transfer graphics 37 or their negative on the donor web 17 to a substrate can be provided by passing the graphics or negative and substrate in face-to-face relationship through an office copy machine 70 of the type designated "Model 45" and available from Minnesota Mining and Manufacturing Company. The copy machine 70 is more fully described in U.S. Pat. No. 2,891,165 (the disclosure whereof is incorporated herein by reference) and is schematically illustrated in FIG. 8.

Briefly, the device 70 includes a driven belt 71 for driving layered sheets 80 along a path defined by rotatable drums, 72, 73, 74 past a lamp 76 providing a source of intense radiation for exposing the sheets 80. When the layered sheets 80 consist of the substrate in face-to-face contact with the granules on the receiving web 14 forming the graphics 37 or the donor web 17 bearing the negative, radiation from the lamp 69 heats the dark granules which adhere to the substrate. Subsequent to such exposure, the donor web 17 or the receiving web 14 is separated from the substrate and granules which preferentially adhere to the substrate.

Figure 6:
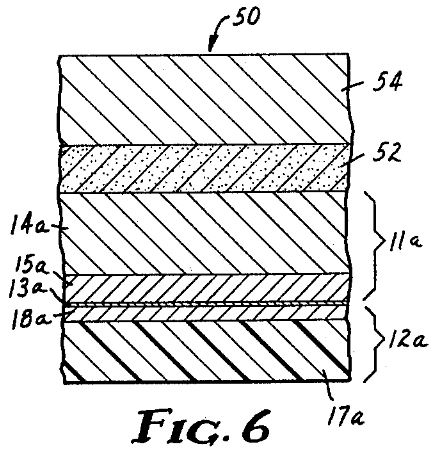
FIG. 6 is an enlarged fragmentary sectional view of a second embodiment of the composite material according to the present invention.

FIG. 6 illustrates a composite strip material 50 which is similar to the strip material 10 (with similar parts being similarly numbered except for the addition of the suffix "a") except that only the donor web 17*a* is transparent to radiation, and the receiving web 14*a* has a coating of pressure-sensitive adhesive 52 on the side opposite the layer of adhesive material 15*a*. The pressure-sensitive adhesive coating 52 is covered by a removable protective overlay 54. Graphics which are readable on the exposed surface after the accepting tape 11*a* is separated from the transfer tape 12*a* are formed by irradiating through the donor web 17*a*. The overlay 54 may then be peeled from the separated accepting tape 11*a* to expose the adhesive coating by which the graphics may be firmly adhered to a substrate. The accepting tape 14*a* and adhesive 52 may be transparent to allow the substrate to provide a background color for the graphics, or the accepting tape 14*a* may be light colored or opaque to provide a background for the graphics.

Figure 7:
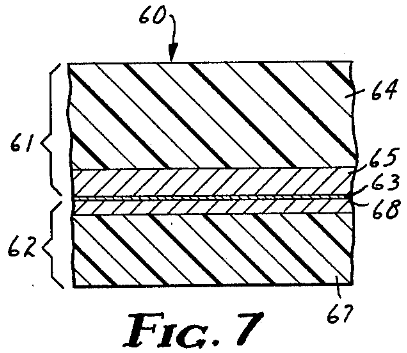
FIG. 7 is an enlarged fragmentary sectional view of a third embodiment of the composite material according to the present invention which is adapted for making copies of a document bearing already composed graphics.
Figure 8:
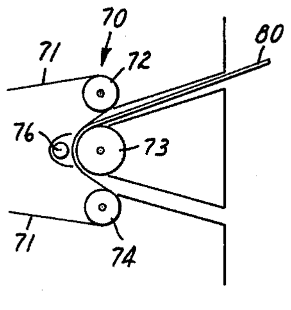
FIG. 8 is a schematic view of a device for making copies of a document with the composite material of FIG. 7.
Figure 9:
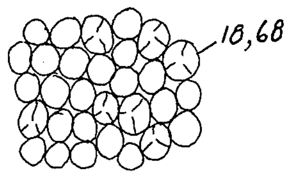
FIGS. 9 and 10 are much enlarged fragmentary top and side views of the layer of granules.
Figure 10:
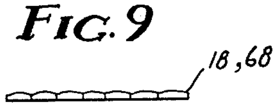

FIG. 7 illustrates a composite material 60 according to the present invention, a sheet of which is useful for making a copy of a document bearing already composed dark colored graphics (as may be desirable to prepare transparencies for an overhead projector) via the office copy machine 70 schematically illustrated in FIG. 8. Like the material 10, the material 60 includes an accepting portion 61 and a transfer portion 62. The portions 61 and 62 each include a coating and are positioned with the coatings in face-to-face relationship and adhered together by a bonding layer 63. The accepting portion 61 consists of a strong, thermally stable receiving web 64 and a firmly adhered coating or layer of adhesive material 65 having a narrow softening range above normal ambient or room temperature. The transfer portion 62 has a strong thermally stable donor web 67 and a mono-layer of granules 68 releasably adhered to the donor web, which granules 68 may be pigmented in any opaque or transparent color.

When a document bearing already composed dark colored graphics is positioned against the outer surface of the receiving web 64 and these layered sheets 80 are fed through the device 70 as illustrated in FIG. 8, radiation from the lamp 76 heats the dark graphics which in turn selectively heat corresponding portions of the adhesive layer 65, the bonding layer 63, and the layer of granules 68; causing the heated portion of the bonding layer 63 to melt and be absorbed by the adhesive and/or the granular layer 68 and the adhesive and granular layers 65 and 68 to adhere together in the graphic pattern.

Subsequent to such exposure, the donor and receiving webs 67 and 64 may be separated whereupon granules from the layer 68 adhere to that portion of the layer of adhesive material 65 which was softened upon exposure by the light and will transfer to the receiving web 64 in accordance with the pattern of received heating to provide a copy of the graphics on the document.

The present invention will be better understood with reference to the following non-limiting examples wherein all parts are by weight unless otherwise specified.

EXAMPLE 1

To prepare an accepting portion 12 of the strip material 10 as shown in FIG. 1, an antistat quaternary amine (Catanac SN) was diluted to 0.25% solids with acetone and reverse roll coated at about 0.11 grams per square meter (0.01 gm/ft$^2$) on a 0.005 centimeter (0.002 inch) thick receiving web 14 of polyethylene terephthalate.

To prepare the layer of adhesive material 15, an open mixing vessel was charged with 16 parts of a polyamide resin (Versamid 940), 42 parts isopropanol and 42 parts heptane. The charge was mixed for about two hours with a one quarter horse power airmixer fitted with a paddle type mixing blade. The resultant mixture was reverse roll coated onto the side of the receiving web 14 opposite the antistat at about 5.38 grams per square meter (0.5 gm/ft$^2$) and the coated web conveyed first for about 20 seconds through a drying oven set at about 38° Centigrade (100° F.) and then for about 1 minute through a drying oven set at about 82° Centigrade (180° F.) to provide a dried firmly adhered layer of adhesive material 15.

The layer of granules 18 for the transfer portion 12 of the strip material 10 was prepared by charging 23 parts of carbon black pigment and 450 parts of a 50/50 blend of isopropanol and heptane to an open mixing vessel and mixing for about two hours with a one quarter horse airmixer fitted with a paddle type mixing blade. To the resultant mixture was added 77 parts of polyamide resin (Versamid 750) after which the mixer was run for an additional two hours. The resultant mixture was repeatedly passed very slowly through a sand mill (i.e. 1 gm/second for a 1.1 liter (1 quart) sand mill wherein 3 passes were required) until the resultant mixture had a particle size of about 5 micron as measured with a "Higman" grind gauge, after which 450 more parts of 50/50 isopropanol and heptane blend were added to flush the sand mill and further dilute the mixture.

This diluted mixture was reverse roll coated on a 0.025 millimeter (0.001 inch) thick donor web 17 of polyethylene terephthalate at a coating weight of about 2.69 gram per square meter (0.25 gm/ft$^2$), and dried by conveying it first for about 20 seconds through a drying oven set at about 38° Centigrade (100° F.) and then for about 1 minute through a drying oven set at about 82° Centigrade (180° F.).

The resultant coating was about 0.0076 millimeter (0.0003 inch) thick, had a smooth shiny appearance, and was a mono-layer of granules, each about 0.076 millimeters (0.003 inch) in diameter.

Material for the bonding layer 13 was prepared by charging 89 parts of heptane and 10 parts of acetone to an open mixing vessel, which vessel was heated slightly to hold the solvent mixture at over 24° Centigrade (75° F.). One part of wax (Shellmax 500) was melted and slowly added to the vessel while the solvents therein were rapidly agitated by a one quarter horse power airmixer fitted with a paddle type mixing blade, the mixer being run for a total time of about one hour to insure that all of the wax had gone into solution.

The resultant wax and solvent solution was coated at a weight of about 0.22 grams per square meter (0.02 gm/ft$^2$) onto the mono-layer of granules 18 using a gravure coater with a 90 line knurl, and was then dried to remove the solvent in an oven set at a temperature of about 38° Centigrade (100° F.).

The wax layer on the granules 18 and the adhesive material 15 on the receiving web 14 were then laminated in face-to-face contact by passing them at about 1.52 meter per minute (5 feet per minute) between two 2.54 centimeter (1 inch) diameter laminating rolls heated to a surface temperature of about 71° Centigrade (160° F.) and biased together with a force of about 0.36 kilogram per centimeter (2 pounds per inch) of strip material width, after which the strip material was maintained in a straight path for a short distance (e.g. over 15 centimeters) until the wax in the bonding layer 13 solidified. Subsequently the strip material was wound on a storage reel from which it was slit to desired widths and rewound on reels adapted to be received in machines for exposing it.

When the strip material was exposed in a 3M Model 287 "Transparency Composer" and its accepting and transfer portions 11 and 12 separated the entire layer of granules in irradiated areas of the strip material 12 adhered to the layer of adhesive material 15 on the receiving web 14 and provided sharp edge resolution for the irradiated areas.

Graphics 37 formed on the accepting tape were easily transferred to a substrate such as paper or a transparent plastic sheet as is used in the preparation of overhead transparencies by positioning the graphics 37 adjacent the substrate and exposing them in the copy machine 70 as is illustrated for the layered sheets 80 in FIG. 8. Almost all of the adhesive material 15 around the graphics 37 remained on the receiving web 14 after it was stripped away, and while portions of the adhesive material 15 over the graphics 37 did transfer, it did not greatly detract from the appearance of the graphics.

The granules which remained on the donor web 17, which had openings corresponding to the graphics 37 formed on the accepting tape 11, could be also transferred from the donor web 17 to a substrate by the method previously described for the graphics 37.

The coating weight of the layer of bonding material 13 could be reduced to about 0.1 gram per square meter (0.01 gm/$ft^2$) or increased to about 0.32 grams per square meter (0.03 gm/$ft^2$) and the resultant strip materials would still produce acceptable graphics. At the lower coating weight the strip material tended to delaminate during slitting and normal handling, however, indicating that the layer of bonding material 13 provided only minimal adhesion; and at the higher coating weight the edge resolution of graphics decreased, presumably because there was sufficient bonding material present to restrict adhesion between the layer of adhesive 15 and the layer of granules 18.

Also the coating weight of the diluted mixture for forming the layer of granules could be reduced to about 1.1 gram per square meter (0.1 gm/$ft^2$) or increased to about 3.77 grams per square meter (0.35 gm/$ft^2$) and the resultant strip materials would still produce acceptable graphics. At the lower coating weights the opacity of the granules 18 decreased significantly, hwoever, thereby affecting the ability of the Model 287 "Transparency Composer" to effectively expose the resultant strip material, and at the higher coating weights the border of graphics produced with the strip material lost edge resolution.

EXAMPLE 2

A strip material was made as in Example 1, except that the transfer tape 12 was made using 25 parts (rather than 23 parts) of the carbon black pigment and the layer of bonding material 13 was coated at a weight of 0.32 grams per square meter (0.03 gm/$ft^2$) (rather than 0.22 grams per square meter).

The resultant mono-layer of granules 18 was found to be significantly more conductive and had a rough exposed surface as compared to the glossy exposed surface of the layer of granules 18 produced in Example 1. These conditions indicated that there was insufficient polyamide resin to absorb all of the carbon black pigment. The conductive nature of the layer of granules 18 provided the advantage of good antistatic properties for the material to restrict the attraction of dirt particles even when the antistatic layer on the receiving web 14 was deleted.

The resolution of graphics formed with this strip material was very similar to the resolution of graphics formed with the strip material prepared in Example 1, and the composite material withstood slitting and normal handling without delamination which indicated that the layer of bonding material 13 provided adequate adhesion between the layer of adhesive 15 and the rough layer of granules 18. The thicker layer of bonding material 13 was apparently required to adhere the rough layer of granules 18 to the layer of adhesive material 15 with the same tenacity exhibited by the layer of bonding material 13 of Example 1, however, when the coating weight of the layer of bonding material 13 was reduced to about 0.22 grams per square meter (0.02 gm/$ft^2$) (the same coating weight used for the smooth layer of granules 18 of Example 1) the strip material required careful handling to prevent delamination.

Increasing the coating weight of the layer of bonding material 13 to 0.43 grams per square meter (0.04 gm/$ft^2$) resulted in decreased edge resolution for the graphics produced.

EXAMPLE 3

A strip material was made as in Example 1 except that the transfer tape 12 was made using 30 parts (rather than 23 parts) of the carbon black pigment and 2 parts of Lecithin to promote absorption of the carbon black by the polyamide resin. Even though the layer of granules 18 in this strip material contained more carbon black than the rough layer of granules 18 in Example 2, it still had a glossy surface similar to that of the layer of granules 18 in Example 1 and was adhered sufficiently well to the layer of adhesive material 15 by a layer of bonding material 13 of the same thickness as that of Example 1 to withstand slitting and normal handling of the strip material. Graphics produced with the strip material had good edge resolution. With the increased carbon loading, the coating weight of the diluted mixture for forming the layer of granules 18 could be reduced below 0.11 grams per square meter (0.1 gm/$ft^2$) and the layer of granules 18 would still retain sufficient opacity for proper exposure by the Model 287 "Transparency Composer".

EXAMPLE 4

A strip material was made as in Example 1 except that a dye layer was coated on the side of the receiving web 14 over the coating of antistat.

The dye layer was prepared by placing 3.92 parts of rubber ("Kraton 1652" from Shell Oil Company) and 6.52 parts of heptane in a vessel, and mixing them together with a paddle type mixer until the rubber was thoroughly dissolved. 1.04 parts of Cyan PP2006 (red dye) and 0.52 parts of the cellulose (Min-U-Sil from Pennsylvania Glass and Sand Corporation, Pittsburgh, Pennsylvania) were then added, and the resultant mixture was ball milled for 24 hours. The resultant dye mixture was then adjusted by adding heptane to provide a mixture of 10% solids and reverse roll coated on the receiving web 14 over the coating of antistat.

The strip material was exposed in a 3M Model 287 "transparency composer" to form graphics. After its accepting and transfer portions 11 and 12 were separated, the dye layer on the receiving web was placed adjacent a sheet of clear 0.076 millimeter (0.003 inch) thick polyester coated with 2.2 gram per square meter (0.2 gm/$ft^2$) of the vinyl designated "VYNW" available from Union Carbide of New York, New York, and the composite run through the office copy machine 70 with the graphics adjacent its source of radiation. Heat absorbed by the graphics caused the dye in the dye layer to vaporize in a pattern corresponding to the graphics and left a sharp permanent transparent red copy of the graphics in the sheet of polyester.

EXAMPLE 5

A composite material adapted for use in copying documents bearing already composed graphics was made as in Example 1 with the webs being an optically clear grade of polyethylene terephthalate, except that 23 parts of phthalocyanine blue pigment were substituted for the carbon black to form the structure illustrated in FIG. 7 with a blue layer of granules 68, and that the composite material was cut into sheets. The donor web 67 of the composite material 60 was placed in face-to-face contact with the graphics on the document and exposed in the office copy machine 70. When the receiving and donor webs 64 and 67 were separated, blue transparent graphics corresponding to the graphics on the document were transferred to the receiving portion 61 which was then suitable for use as a transparency in an overhead projector.

Pthalocyanine green pigment or red lake C pigment could be substituted for the phthalocyanine pigment to respectively provide green or red graphics.

I claim:

1. In a composite material for forming graphics such as letters, numbers, symbols or pictures in accordance with patterns of heating, the composite material comprising a donor web, a friable layer of granules releasably adhered to the donor web; and an accepting portion comprising a layer of latent adhesive material facing the layer of granules, which adhesive material is nontacky at normal room temperature, but is selectively softened and activated when heated to a temperature range somewhat above normal room temperature and then adheres to granules so that upon separation of the accepting tape and donor web, the granules are carried to the accepting tape only in heated areas, the improvement wherein said layer of granules is a mono-layer.

2. A composite material according to claim 1, wherein said granules are plate-like and have an average diameter generally in the range of 0.0025 to 0.010 centimeter.

3. A composite material according to claim 1, wherein said layer of granules comprises a radiation absorbing material.

4. A composite material according to claim 1, wherein said granules comprise polyamide resin.

5. A composite material according to claim 1, wherein said layer of granules comprises a colored pigment.

* * * * *